United States Patent [19]

Norman

[11] Patent Number: 4,481,181

[45] Date of Patent: Nov. 6, 1984

[54] HYDROGEN PRODUCTION FROM IN SITU PARTIAL BURNING OF $H_2S$

[75] Inventor: John H. Norman, La Jolla, Calif.

[73] Assignee: GA Technologies Inc., San Diego, Calif.

[21] Appl. No.: 537,299

[22] Filed: Sep. 29, 1983

Related U.S. Application Data

[63] Continuation-in-part of Ser. No. 345,034, Feb. 8, 1982, abandoned.

[51] Int. Cl.$^3$ .............................................. C01B 17/04
[52] U.S. Cl. ................................ 423/573 G; 423/571; 423/573 R; 423/648 R
[58] Field of Search ........... 423/648 R, 573 R, 573 G, 423/571

[56] References Cited

U.S. PATENT DOCUMENTS 4,302,434 11/1981 Hellmer et al. ...................... 423/571
4,439,412 3/1984 Behie et al. ...................... 423/573 G Primary Examiner—John Doll
Assistant Examiner—Jackson Leeds
Attorney, Agent, or Firm—Fitch, Even, Tabin & Flannery

[57] ABSTRACT

Hydrogen is produced from hydrogen sulfide by coupling, in a single reaction zone, the partial oxidation of hydrogen sulfide to water and sulfur with the thermal decomposition of hydrogen sulfide to hydrogen and sulfur. When one mole of hydrogen sulfide is burned with a stoichiometric deficiency of oxygen, enough thermal energy is generated by the exothermic partial oxidation to effect the thermal dissociation of about two moles of hydrogen sulfide. The gas mixture exiting from the reaction zone is substantially instantaneously cooled by quenching with cooler gas of substantially the same composition to prevent significant recombination of hydrogen and sulfur. The thermal energy in the gas following the quench step is used to preheat the $H_2S$ and to cause some dissociation before entry into the reaction zone.

11 Claims, No Drawings

HYDROGEN PRODUCTION FROM IN SITU PARTIAL BURNING OF H₂S

This application is a continuation-in-part of my earlier application Ser. No. 345,034 filed Feb. 8, 1982 now abandoned.

The present invention relates to a process for producing hydrogen from hydrogen sulfide.

BACKGROUND OF THE INVENTION

Hydrogen sulfide is a noxious, poisonous component of the off-gas of a number of industrial processes, e.g., the desulfurization of crude oil. Industrial off-gas is commonly used as a fuel in furnaces; however, if the off-gas has a high hydrogen sulfide content, its combustion produces substantial amounts of sulfur dioxide which also creates environmental problems. Hence, off-gas, high in hydrogen sulfide content, is undesirable for use as a fuel.

Several methods have been described for obtaining useful substances from off-gas-derived hydrogen sulfide, but only one, i.e., the Claus method, has had commercial significance. The Claus method is a two-step reaction which results in the production of water and elemental sulfur according to the following formulae;

$$H_2S + 3/2\, O_2 \rightarrow H_2O + SO_2$$
$$2H_2S + SO_2 \rightarrow 2H_2O + 3S$$
$$\overline{3H_2S + 3/2\, O_2 \rightarrow 3H_2O + 3S}$$

The Claus method produces one usable substance, sulfur, from the hydrogen sulfide, but discards the valuable hydrogen component in the form of water. Thus, the Claus process not only fails to utilize the full potential sulfide through complete combustion, as is the case when it is fully burned directly, but also fails to recover the hydrogen component.

It is known to thermally decompose hydrogen sulfide to hydrogen and sulfur; however, this reaction is highly endothermic and does not proceed far at temperatures below about 1200° K. Direct methods of H₂S dissociation, such as that described in U.S. Pat. No. 2,979,384 in which H₂S is passed over a glowing tungsten filament, have not proven to be commercially feasable.

Reaction temperatures above 1200° K. were heretofore considered impractical for effecting the thermal decomposition of hydrogen sulfide, and several catalytic methods have been described for decomposing hydrogen sulfide at lower temperatures in which reasonable yields are achieved by removal of product, i.e., sulfur, from the reaction mixture. U.S. Pat. No. 4,008,174 teaches reacting hydrogen sulfide with a metal sulfide to form a metal disulfide plus hydrogen, and subsequently regenerating the metal monosulfide from the disulfide using heat. In U.S. Pat. No. 3,856,925, a process is described in which hydrogen sulfide is decomposed in the presence of a metal sulfide, and the sulfur is removed from the metal sulfide, subsequently or concurrently, by carbon monoxide or nitrogen monoxide.

SUMMARY OF THE INVENTION

A process is provided for the recovery of hydrogen from hydrogen sulfide utilizing the partial combustion of hydrogen sulfide with oxygen to produce sufficient heat to effect thermal decomposition of a substantial portion of the unoxidized hydrogen sulfide. Hydrogen sulfide is introduced along with oxygen into a reaction zone in a molar or volume ratio of greater than 10:1. The exothermal combustion reaction, which yields sulfur and water, is used to effect the final raise in temperature and to maintain the temperature within the reaction zone above 1300° K. where a significant percentage of the unoxidized hydrogen sulfide is decomposed to yield hydrogen and sulfur. The gas mixture is withdrawn from the chamber at above 1300° K. and promptly quenched by mixture with cooler gas to substantially instantaneously reduce the temperature of the gas to below about 1200° K., effectively blocking any significant recombination of elemental hydrogen and elemental sulfur which would otherwise occur in the time usually required to operate even a fast heat-exchanger. The available heat in the gases which result from quenching is used to raise the temperature of the incoming stream to at least about 1100° K.

DETAILED DESCRIPTION OF THE PREFERRED EMBODIMENTS

In accordance with the present invention, an in situ process is provided for the production of hydrogen from hydrogen sulfide. Hydrogen sulfide is burned in the presence of a stoichiometric deficiency of oxygen to produce water, sulfur and heat, and the generated heat is used to maintain the temperature within the reaction zone above 1300° K. so as to cause thermal decomposition of some of additional unoxidized hydrogen sulfide to elemental hydrogen and elemental sulfur. Recombination of elemental hydrogen and elemental sulfur is effectively blocked by rapidly quenching the hot gas by admixture with a cooler gas stream.

In the presence of sufficient oxygen, burning of hydrogen sulfide results in complete combustion to water and sulfur dioxide, i.e., the reaction which occurs when flue gas containing hydrogen sulfide is burned in a furnace. In a stoichiometric deficiency of oxygen, SO₂ is not formed in any significant quantity and the combustion of hydrogen sulfide primarily produces water and sulfur by the reaction:

$$H_2S + \tfrac{1}{2}O_2 \rightarrow H_2O + \tfrac{1}{2}S_2 \quad \Delta H = -37.8 \text{ Kcal/mole} \qquad (I)$$

At high temperatures, hydrogen sulfide readily thermally decomposes to hydrogen and sulfur by the reaction:

$$H_2S \rightarrow H_2 + \tfrac{1}{2}S_2 \quad \Delta H = 21.6 \text{ Kcal/mole} \qquad (II)$$

Because the heat generated in exothermic reaction I is approximately double the heat needed to drive reaction II to completion, the partial oxidation of one mole of H₂S may be effectively used to dissociate about two moles of H₂S.

In addition to being endothermic, the equilibrium of the thermal decomposition of hydrogen sulfide (reaction II) lies very much to the left, and the reaction does not proceed to an industrially important extent below about 1300° K. For example, at 1000° K., 1 atm. pressure, only about 4.5% of H₂S dissociates. To effect significant dissociation at temperatures below 1000° K., processes have been described in which one of the products, typically sulfur, is removed from the reaction zone, e.g., by condensation or by further reaction, but these processes either require regeneration of the reaction zone or yield products other than elemental hydrogen and elemental sulfur.

It was heretofore thought to be commercially impractical to supply the high temperature heat needed for hydrogen sulfide dissociation. Generation of adequate high temperatures requires the input of substantial amounts of energy through heat exchange or the like, and such input of energy must be weighed against the commercial energy value of the hydrogen produced by the process. It is found that, by coupling the partial oxidation of hydrogen sulfide to its thermal decomposition in situ and recovering the high quality heat from the reaction zone gases for use in heating the incoming stream, temperatures of up to about 1600° K. may be economically achieved within a reaction zone without the input of external energy once the process has been started.

The present process may be carried out in the absence of catalysts in the high temperature reaction zone because of the very rapid dissociation of hydrogen sulfide to elemental hydrogen and elemental sulfur at these temperatures. The reaction zone may be lined with a silica-based firebrick which is unreactive with hydrogen sulfide. Adequate high temperature insulation for the reactor provides for efficient utilization of the high quality heat generated in the in situ adiabatic process.

There is sufficient heat energy liberated to cause nearly two moles of hydrogen sulfide to dissociate by reaction II for every mole of hydrogen sulfide that is partially oxidized in reaction I, and the required molar ratio of hydrogen sulfide to oxygen might be as low as about 6:1 if both reactions went to completion. However, the thermodynamic equilibrium of reaction II is such that, in the temperature range preferably used for this process, i.e., about 1300° to 1500° K., only about 30% of the unoxidized $H_2S$ dissociates. In order to fully utilize the heat produced in reaction I to produce elemental hydrogen and elemental sulfur by reaction II, enough hydrogen sulfide should be introduced so that sufficient unoxidized hydrogen sulfide is available to allow for dissociation of about two moles of hydrogen sulfide per mole of hydrogen sulfide burned, taking into consideration the equilibrium of reaction II. That is, sufficient hydrogen sulfide should be introduced so that enough unoxidized hydrogen sulfide is available for dissociation of four moles of hydrogen sulfide per mole of oxygen used in reaction I. Dividing 4 by 0.3 (the fraction of unoxidized hydrogen sulfide which dissociates), it can be seen that about 13 moles of hydrogen sulfide (depending upon the precise temperature being maintained) should be introduced, in addition to the 2 moles of hydrogen sulfide to be burned in reaction I by one mole of oxygen, to allow for maximum dissociation. Thus, the theoretical optimal molar or volume ratio of hydrogen sulfide to oxygen, on the basis of 30% hydrogen sulfide dissociation, is about 15:1. However, the molar ratio of $H_2S$ to $O_2$ will depend somewhat upon the precise temperature and pressure maintained within the reaction zone, which is preferably controlled by adjusting the relative amounts of hydrogen sulfide and oxygen introduced. Should the temperature in the reaction zone begin to rise above the desired temperature, the amount of $H_2S$, relative to oxygen, may be increased to halt such a temperature rise; however, an overabundance of hydrogen sulfide is energy-inefficient because the excess (over the 15:1 ratio) must be heated, cooled and recovered during the process. Accordingly, the molar ratio of hydrogen sulfide to oxygen being introduced is generally maintained at between about 10:1 and about 25:1 and preferably between about 12:1 and about 20:1. When a temperature of about 1400° K., 1 atm, is maintained, the ratio is most preferably held between about 12:1 and about 15:1. With respect to these two gases, the molar ratio is essentially the same as the volume ratio.

In order that substantially all of the heat generated by reaction I is available to drive reaction II, the hydrogen sulfide is preheated to above 1100° K. and preferably to at least about 1125° K. so that significant low-temperature dissociation occurs prior to its introduction into the reaction zone. With efficient heat exchange, the incoming hydrogen sulfide can be heated to within about 50° K. of the temperature of the quenched gas stream using countercurrent heat exchange. The incoming oxygen stream also is preferably preheated, but as the oxygen constitutes only a small portion of the reactant gases, this is not as critical, particularly if introduced as substantially pure oxygen as is preferred. Air or oxygen-air mixtures might also be utilized so long as provision is made to recover the high-quality heat from all the products and to separate the process gases from the nitrogen.

In order to maximize the essential dissociation of hydrogen sulfide that occurs during preheating in the heat exchanger, the heat exchanger through which the incoming hydrogen sulfide passes may optionally be lined with a catalyst, such as molybdenum sulfide. The catalyst increases the rate of dissociation so that, at the lower temperature involved, the hydrogen sulfide dissociation more quickly approaches equilibrium. The equilibrium of the dissociation reaction shifts progressively farther to the right as the temperature rises, and the use of a catalyst in the heat exchanger may result in a greater percentage of hydrogen and sulfur, relative to hydrogen sulfide, being present in the stream entering the reaction zone. Such a catalyst might be used only on the downstream portions of the hydrogen sulfide side of a countercurrent-flow heat exchanger, where the incoming $H_2S$ stream has reached a temperature above about 800° K. and dissociation will be significant. The value of this lower temperature pre-dissociation lies in the fact that it utilizes lower quality available heat, as compared to the direct-burn heat, and thus contributes strongly to the overall efficiency. In fact, about one-third to about one-half of the total dissociation which occurs during one pass will occur prior to entry into the reaction zone.

At temperatures of about 1100° K. and above, elemental oxygen reacts readily with the hydrogen sulfide in the stated volume ratio of hydrogen sulfide to oxygen, and the oxidation proceeds substantially entirely according to reaction I rather than producing significant amounts of $SO_2$ because of the large stoichiometric excess of $H_2S$. The heat produced by the oxidation immediately raises the temperature of the gases within the reaction zone, and the rate of supply of oxygen is adjusted to assure that the temperature in the zone is above 1300° K. Preferably, the temperature in the reaction zone is maintained at between about 1300° and 1500° K. where, as a result of the thermodynamic equilibrium of reaction II, about 30% of the unoxidized hydrogen sulfide is dissociated.

It should be recognized that a very significant amount of the heat produced by the partial oxidation reaction in the reaction zone is used to raise the temperature of the incoming gas to the higher temperatures (e.g. 1400° K.) where the remainder of the dissociation takes place. This heat input is also driving the endothermic dissociation reaction which becomes more rapid as the temperature increases. However, a critical factor in the process design of this invention is that the significant partial dissociation of the incoming gas which has occurred as a consequence of preheating in the heat exchanger can be considered to offset the heat used to further raise the temperature of the streams entering the reaction zone. Therefore, close to about two moles of hydrogen sulfide can theoretically be dissociated for each mole of hydrogen sulfide which is partially oxidized in the process even when the controlled quench is taken into consideration. The process is operated so that the amount of H$_2$S which undergoes partial combustion is not greater than the amount which undergoes thermal dissociation, and it is considered to be far more efficient than any known process when not more than about 45% of the H$_2$S which reacts is partially oxidized. Preferably such efficient use is made of the high quality heat available following the gas quench that at least about 60% of the H$_2$S that reacts is dissociated.

Although dissociation occurs to a greater extent at even higher temperatures, the rapid interconversion between reactants and products makes it difficult to quench high temperature reactions fast enough to prevent appreciable recombination of hydrogen and sulfide, and additional energy spent creating higher temperatures is wasted if a greater yield of increased dissociation cannot be realized. Thus it is not presently contemplated that temperatures above about 1600° K. would be used in the process. Because of extremely rapid interconversion between H$_2$S and H$_2$ and S$_2$ at the stated temperatures, a dwell time in the reaction zone longer than about 1 second is not considered a significant factor.

A temperature probe is used to determine the temperature within the reaction zone, and the flow of oxygen and/or hydrogen sulfide into the zone is adjusted to maintain optimal temperatures within the reaction zone. The proper temperature is preferably maintained within the reaction zone by continuous adjustment of the rate at which oxygen is being introduced into the reaction zone. Once the process is begun, it is self-sustaining without the addition of external heat, although external heat may be supplied to initially bring the reaction zone to operating temperatures. Alternatively, greater amounts of oxygen may be introduced at the start-up of operations to bring the reaction zone up to operating temperatures.

Although it may be possible in some circumstances to utilize certain hydrogen sulfide-containing gases in the heat-exchange-intensive process of the present invention, it is preferred to initially recover the hydrogen sulfide from these gases. Concentration of H$_2$S from such gas may be effected by the Girbotol process using alkanolamines, by the ADIP process using diisopropanolamines or by another suitable known process.

The reaction is preferably carried out at near atmospheric pressure, i.e., about 0.3 to about 3 atmospheres. This obviates the need to provide special equipment for maintaining and handling significant negative and/or positive gas pressures. However, it is contemplated that the process may be operated at greater pressures, e.g., up to about 10 atmospheres at appropriate temperatures and quenching rates, depending on engineering requirements. More complete H$_2$S dissociation and relatively slower reactions are achieved at lower pressures, but higher pressures may be desirable from an engineering throughput standpoint.

The gas mixture exiting the reaction zone includes water, hydrogen sulfide, vaporized sulfur (substantially all in the form of S$_2$) and hydrogen gas (H$_2$) in addition to any other gases or products thereof introduced into the system, e.g., if air is used as the oxygen source the mixture will contain a significant amount of nitrogen. The hydrogen sulfide is in equilibrium with the sulfur vapor and hydrogen gas, with the reactants and products tending to interconvert very rapidly. If allowed to cool slowly to a temperature where the equilibrium of the dissociation reaction (II) is far to the left of what it is at about 140° K., reconversion of a substantial amount of product hydrogen and sulfur to hydrogen sulfide will occur. Reconversion is blocked by substantially instantaneously lowering the temperature of the gas mixture stream withdrawn from the reaction zone to a temperature where the rate of reaction of recombination of sulfur and hydrogen is very substantially slower. Below about 1200° K. and particularly at about 1150° K. and below, the rate of reaction is sufficiently slow that product loss is insignificant so long as fast heat exchange is employed thereafter. By fast heat-exchange is meant at an initial cooling rate of about 200° K. in the first second and somewhat more slowly progressively thereafter. Quenching is preferably carried out to lower the temperature of the gas mixture stream from about 1400° K. to about 1200° K. in less than one second, more preferably in about 100 milliseconds or less. It has been found that quenching in about 10 milliseconds is practical.

It has been found that such rapid lowering of the temperature of the gas stream withdrawn from the reaction zone, e.g., about 1400° K., can be effected by well-engineered mixing with a quench gas stream at a lower temperature, whereupon the lowering of gas temperature is substantially instantaneous with mixing. The quenching gas may be supplied from an external source, e.g., steam; however, it is preferred to quench the high temperature gas stream by recirculating a part of the process stream itself after it has given up some of its sensible heat to the incoming stream. In this manner, use of the high temperature sensible heat of the newly withdrawn gas mixture is maximized, and the high quality heat remains available to heat the incoming streams.

The efficiency of the overall process depends primarily on the utilization of thermal energy generated by reaction I. It is desirable that substantially all of the heat of combustion of reaction I is consumed in reaction II, although some will practically be used to provide the final sensible heat requirements necessary to raise the reactants to the reaction temperature. The gas mixture leaving the reaction chamber has substantial amounts of sensible and latent heat which is recovered and efficiently put to use. The polymerization of S$_2$ vapor to S$_8$ vapor at between 900° K. and 600° K. represents latent heat of about 12 Kcal/mole. Condensation of S$_8$ to S(l) at between 600° K. and 500° K. represents about another 2 Kcal/mole. Likewise, the water vapor produced in reaction I represents additional latent thermal energy.

The utilization of the sensible and, to a lesser extent, the latent energy of the product gas mixture, particularly the high quality heat, is crucial to the efficiency of the process. It is conserved by passing the hot gas mixture in heat exchange relation, e.g., through a countercurrent heat exchanger, with the incoming hydrogen sulfide and, perhaps, separately with the oxygen or air. Residual thermal energy of the gases can also be utilized, e.g., to produce steam for use in other processes in or external to the plant.

The hot gas mixture from the quench step continuously flows directly into an inlet of a countercurrent flow heat exchanger where its high quality heat is transferred through heat exchange surfaces to effect the final pre-heating of the incoming hydrogen sulfide. The heat exchanger is preferably operated to heat the stream flowing toward the reaction zone to about 1150° K., while also quickly lowering the product gas temperature to about 1000° K. so as to minimize recombination to $H_2S$. Preferably, the temperature of the product stream is reduced to about 1000° K. within about one second after entering the heat exchanger, which meets the criterion of fast heat-exchange. The exit flow from the heat exchanger is split to create a side stream, equal to about two-thirds to about 40% of the total product stream, that is recirculated to the quench region.

The combination of the gas quench step to quickly lower the temperature and minimize recombination to $H_2S$ with the immediate use and recovery of the high quality heat by effecting final pre-heating of all of the incoming $H_2S$ results in unexpected efficiencies that, for the first time, render such an $H_2S$ conversion process truly economical. The creation, followed by the effective use, of a very large quantity of high quality (i.e. about 1200° K.) heat through the medium of the gas quench step makes possible the effective, substantially complete pre-heating of the incoming stream by heat-exchange with the product gas without consuming a substantial excess of $H_2S$ by combustion to produce such heat.

Between about 600° K. and about 500° K., sulfur vapor condenses and becomes molten sulfur, and below about 500° K., molten sulfur becomes highly viscous before solidifying at about 400° K. Accordingly, heat exchangers for use in the process preferably include means of siphoning off the molten sulfur from the gas stream at temperatures above 500° K. so that thickening and solidification need not be dealt with.

Cooling of the gas mixture results in condensation of the sulfur at between 600° K. and 500° K., and condensation of water below 400° K., and thus water and sulfur are easily removed from the gas stream. Hydrogen sulfide may be separated from the hydrogen gas by the above-mentioned hydrogen sulfide recovery methods, or alternatively, may be separated by an appropriate permeselective membrane which permits free passage of hydrogen but retards hydrogen sulfide or vice versa. The hydrogen is collected for use as a fuel source, and the hydrogen sulfide is returned to the incoming gas stream. Although only about 30% of the hydrogen sulfide is dissociated in each passage through the reaction zone, complete processing of hydrogen sulfide is ultimately achieved by repeated recirculation through the reaction zone followed by quenching and removal of hydrogen and sulfur.

EXAMPLE

Pre-heated hydrogen sulfide (98% purity) is introduced along with a separate stream of oxygen (99% purity) into an alumina-based firebrick reaction chamber to effect the partial oxidation of hydrogen sulfide to water and elemental sulfur and the coupled thermal dissociation of hydrogen sulfide to hydrogen and sulfur. A countercurrent heat exchanger is utilized to complete the preheating of the hydrogen sulfide stream, prior to its entry into the reaction chamber, using heat from the hot product gas stream. The heat-exchanger on the hydrogen sulfide side is lined with molybdenum sulfide for about one-third of the length thereof adjacent the downstream end. The exit gas mixture from the reaction chamber immediately flows to a quench chamber where it is mixed with a recirculation stream split from exit stream supplying heat to the heat exchanger.

The system is equilibrated until the temperature in the reaction chamber is about 1400° K., and the incoming hydrogen sulfide is preheated to about 1150° K. in the countercurrent heat exchanger. The system is operated at substantially atmospheric pressure, and the volume of oxygen being introduced is adjusted so that its ratio to the volume of hydrogen sulfide being introduced is between about 1 to 13 and about 1 to 14. The exit gas stream leaving the reaction chamber is immediately mixed in a quenching chamber with the recirculation stream which is about 0.7 times its volume and which is at about 1000° K., to effect a drop in its temperature from about 1400° K. to about 1200° K. in a period of milliseconds, e.g., about 10 milliseconds. The about 1400° K. gas mixture entering the quenching chamber contains about 51% by volume hydrogen sulfide, about 13% water, about 16% sulfur as $S_2$ and about 20% hydrogen. The high volume stream leaving the quench chamber promptly enters the final heat exchanger, and within about one second after its exit from the quench chamber, its temperature has dropped to about 1000° K. At this point, a side stream equal to about 41% of the total volume of the stream is diverted for recirculation to the inlet of the quench chamber. The remainder of the stream enters an intermediate heat exchanger from which it exits at about 500° K. There is more than enough sensible and latent heat in this stream and in the molten sulfur to initially heat the $H_2S$ incoming stream. Analysis of the ultimate gas stream is compared to analysis of a sample taken from the reaction chamber and cooled immediately to about 500° K. Comparison shows substantially the same volume percent of $H_2$ relative to $H_2S$, showing that the prompt quench effectively prevents significant reconversion of $H_2$ and sulfur to $H_2S$, and that more than 61% of the $H_2S$ that reacts is dissociated to $H_2S$.

This example demonstrates that economically viable amounts of hydrogen can be produced by the thermal dissociation of hydrogen sulfide at temperatures which may be maintained by utilizing only the heat produced by the partial oxidation of hydrogen sulfide. The lack of substantial change in composition from the gas mixture entering the gas quench to the gas mixture exiting the intermediate heat exchanger demonstrates that recombination of hydrogen and sulfur can be effectively blocked by substantially instantaneous gas quenching and subsequent fast heat exchange.

The advantages of the process of the present invention should now be more fully appreciated. The invention provides a method whereby between approximately two thirds and one-half of the hydrogen content of an input stream of hydrogen sulfide can be recovered as elemental hydrogen. By coupling the dissociation of hydrogen sulfide with the partial oxidation of hydrogen sulfide, the process can generate essentially all of its own heat, with a significant quantity of additional low quality heat being available. By carrying out the coupled reactions in situ, substantially all of the energy produced by the exothermic oxidation reaction is immediately available for driving the endothermic dissociation reaction. This efficient utilization of energy thermally decomposes hydrogen sulfide under conditions where there is generally no need to regenerate catalysts or catalytic reactants or to remove sulfur from the reaction zone.

While the invention has been described in terms of a preferred embodiment, modifications obvious to one with ordinary skill in the art may be made without departing from the scope of the invention. Various features of the invention are emphasized in the following claims.

What is claimed is:

1. A process for producing hydrogen from hydrogen sulfide consisting essentially of heating an incoming stream consisting essentially of hydrogen sulfide to at least about 1100° K., introducing said heated hydrogen sulfide stream and oxygen into a reaction zone in a volume ratio of between about 10:1 and about 25:1 and controlling said introduction to maintain the temperature in said reaction zone between about 1300° K. and 1600° K. under conditions which effect thermal dissociation of hydrogen sulfide and partial combustion of hydrogen sulfide to water and sulfur without the addition of heat from other sources and with the amount of hydrogen sulfide that undergoes partial combustion being not greater than the amount which undergoes thermal dissociation into hydrogen and sulfur within said reaction zone, withdrawing gas containing said dissociated hydrogen and sulfur from said reaction zone and promptly mixing said withdrawn gas with a cooler gas stream to quench the high temperature thereof to about 1200° K. or below and prevent substantial recombination of hydrogen and sulfur within said withdrawn gas, employing heat from said total quenched gas stream to heat said incoming stream of hydrogen sulfide to a temperature of at least about 1100° K. prior to its introduction into said reaction zone and separating a side stream therefrom which is used as said cooler gas stream, and recovering hydrogen from said withdrawn gas subsequent to said quenching step.

2. A process according to claim 1 wherein the pressure in said reaction zone is maintained between about 0.3 to about 3 atmospheres.

3. A process according to claim 1 wherein said volume ratio of hydrogen sulfide to oxygen being introduced is between about 12:1 and about 20:1.

4. A process according to claim 1 wherein substantially only heat from said withdrawn gas is used to preheat said hydrogen sulfide.

5. A process according to claim 1 wherein the temperature in said reaction zone is maintained at about 1400° K.

6. A process according to claim 5 wherein the temperature of said withdrawn gas is reduced from about 1400° K. of above to below about 1200° K. in less than 1 second.

7. A process according to claim 6 wherein the temperature of said quenched gas stream is quickly cooled to about 1000° K. or below in about 1 second or less.

8. A process according to claim 7 wherein no more than about 40% of the hydrogen sulfide which reacts is partially combusted while the remainder is thermally dissociated.

9. A process according to claim 1 wherein said temperature of said withdrawn gas is cooled to at least about 1200° K. in about 100 milliseconds or less and at least about 55% of the hydrogen sulfide which reacts is dissociated.

10. A process according to claim 1 wherein said oxygen is provided by a stream of substantially pure oxygen.

11. A process according to claim 1 wherein said oxygen is provided by a stream containing oxygen and a substantial proportion of nitrogen, and wherein said nitrogen is subsequently separated from said total quenched gas stream after the high quality heat is recovered therefrom.

* * * * *